(12) United States Patent
Buzzalino et al.

(10) Patent No.: US 12,501,278 B2
(45) Date of Patent: Dec. 16, 2025

(54) GENERATING WIRELESS COVERAGE MAPS

(71) Applicant: Intergraph Corporation, Madison, AL (US)

(72) Inventors: Javier Buzzalino, Simpsonville, SC (US); Julio P. Roque, Coconut Grove, FL (US); Peng Tang, Greer, SC (US)

(73) Assignee: Intergraph Corporation, Madison, AL (US)

( * ) Notice: Subject to any disclaimer, the term of this patent is extended or adjusted under 35 U.S.C. 154(b) by 386 days.

(21) Appl. No.: 18/084,843

(22) Filed: Dec. 20, 2022

(65) Prior Publication Data

US 2024/0205692 A1 Jun. 20, 2024

(51) Int. Cl.
*H04W 16/18* (2009.01)
*H04W 64/00* (2009.01)

(52) U.S. Cl.
CPC ........... *H04W 16/18* (2013.01); *H04W 64/00* (2013.01)

(58) Field of Classification Search
CPC ..... H04W 16/18; H04W 64/00; H04W 24/08; H04W 24/10
See application file for complete search history.

(56) References Cited

U.S. PATENT DOCUMENTS 9,578,495 B2   2/2017  Xiang et al.
11,405,441 B1*  8/2022  Farmer ................ H04B 7/0413

2010/0240346 A1   9/2010  Jain et al.
2011/0167128 A1   7/2011  Raghunathan et al.
2013/0308470 A1  11/2013  Bevan et al.
(Continued)

FOREIGN PATENT DOCUMENTS

EP    2897389 A2     7/2015
WO    2021/196117 A1  10/2021
(Continued)

OTHER PUBLICATIONS

International Search Report and the Written Opinion of the International Searching Authority for PCT Application No. PCT/US2023/035012, dated Jan. 23, 2024 (15 Pages).
(Continued)

*Primary Examiner* — Umair Ahsan
(74) *Attorney, Agent, or Firm* — Nutter McClennen & Fish LLP

(57) ABSTRACT

Generating wireless coverage maps includes receiving, for each of a plurality of mobile devices communicating wirelessly with a server system, mobile device location information and mobile device communication service information; generating a dead zone volume map based on the mobile device location information and the mobile device communication service information, the dead zone volume map defining a dead zone volume for a wireless communication service; and generating a dead zone geofence boundary volume map based on the dead zone volume map, the dead zone geofence boundary volume map defining a geofence boundary relative to the dead zone volume and further defining a buffer zone between at least a portion of the geofence boundary and at least a portion of the dead zone volume, the buffer zone defining a zone in which the wireless communication service is available for at least one of the mobile devices.

21 Claims, 12 Drawing Sheets

(56) References Cited

U.S. PATENT DOCUMENTS

| | | | |
|---|---|---|---|
| 2014/0045481 A1 | 2/2014 | Fraley | |
| 2016/0174183 A1* | 6/2016 | Sun | H04W 4/023 |
| | | | 455/456.2 |
| 2016/0380820 A1 | 12/2016 | Horvitz et al. | |
| 2018/0262266 A1* | 9/2018 | Ravishankar | H04W 48/04 |
| 2019/0394720 A1 | 12/2019 | McCoy et al. | |
| 2021/0184702 A1 | 6/2021 | Sandoval | |
| 2023/0041568 A1* | 2/2023 | Pan | H04W 28/0236 |
| 2023/0276335 A1* | 8/2023 | Nakayama | H04W 36/00835 |
| | | | 455/436 |
| 2023/0300707 A1 | 9/2023 | Nakayama et al. | |
| 2024/0205642 A1 | 6/2024 | Buzzalino et al. | |
| 2024/0205705 A1 | 6/2024 | Buzzalino et al. | |
| 2024/0205706 A1 | 6/2024 | Buzzalino et al. | |
| 2024/0205707 A1 | 6/2024 | Buzzalino et al. | |

FOREIGN PATENT DOCUMENTS

| | | | |
|---|---|---|---|
| WO | 2022/024196 A1 | 2/2022 | |
| WO | 2022/024197 A1 | 2/2022 | |

OTHER PUBLICATIONS

Non-Final Office Action for U.S. Appl. No. 18/084,846, dated Mar. 20, 2025 (37 pages).
Non-Final Office Action for U.S. Appl. No. 18/084,847, dated Mar. 27, 2025 (14 pages).
Non-Final Office Action for U.S. Appl. No. 18/084,852, dated Mar. 20, 2025 (14 pages).
Non-Final Office Action for U.S. Appl. No. 18/084,855, dated Mar. 25, 2025 (21 pages).

* cited by examiner

Monitor changes in a dead zone volume relative to a location of a mobile device in communication with a server system via a wireless communication service
1202

Determine that the dead zone volume is approaching the location of the mobile device such that the mobile device is predicted to enter the dead zone volume
1204

Determine at least one data asset that will be needed for offline work within the dead zone volume
1206

Automatically transmit the at least one data asset from the server system to the mobile device via the wireless communication service prior to the mobile device entering the dead zone volume
1208

Determine that the mobile device has subsequently exited the dead zone volume
1210

Automatically resynchronize offline data stored locally by the mobile device while in the dead zone volume with corresponding data stored on the server system
1212

FIG. 12

GENERATING WIRELESS COVERAGE MAPS

CROSS-REFERENCE TO RELATED APPLICATION(S)

Certain embodiments may incorporate or utilize problem solving systems of the types described in U.S. patent application Ser. No. 17/675,439 entitled CLOUD-BASED SYSTEMS FOR OPTIMIZED MULTI-DOMAIN PROCESSING OF INPUT PROBLEMS USING MULTIPLE SOLVER TYPES filed Feb. 18, 2022; U.S. patent application Ser. No. 17/675,454 entitled CLOUD-BASED SYSTEMS FOR OPTIMIZED MULTI-DOMAIN PROCESSING OF INPUT PROBLEMS USING A SERVERLESS REQUEST MANAGEMENT ENGINE NATIVE TO A SERVER CLOUD INFRASTRUCTURE filed Feb. 18, 2022; and U.S. patent application Ser. No. 17/675,471 entitled CLOUD-BASED SYSTEMS FOR OPTIMIZED MULTI-DOMAIN PROCESSING OF INPUT PROBLEMS USING MACHINE LEARNING SOLVER TYPE SELECTION filed Feb. 18, 2022, each of which claims the benefit of U.S. Provisional Patent Application No. 63/231,997 entitled CLOUD-BASED SYSTEMS FOR OPTIMIZED MULTI-DOMAIN PROCESSING OF INPUT PROBLEMS filed Aug. 11, 2021. Each of these patent applications is hereby incorporated herein by reference in its entirety.

FIELD OF THE INVENTION

The invention generally relates to identification and tracking of data communication dead zones such as for continuation of services in an enterprise asset management (EAM) system.

BACKGROUND OF THE INVENTION

In today's "connected" world, mobile computing devices are almost ubiquitous. Such mobile computing devices can include devices that are carried or worn by users (e.g., smartphones, tablet computers, laptop computers, smart watches and other wearables, smart fabrics, etc.) as well as other types of mobile computing devices that are disposed in a wide range of products (e.g., vehicles, IoT devices, etc.). Such mobile computing devices can use any of a wide variety of wireless communication technologies (e.g., cellular, Wi-Fi, Bluetooth, NFC, satellite, etc.) in order to provide connectivity for a particular computing purpose (e.g., downloading data, uploading data, Internet access, client-server communication, etc.).

Each type of wireless communication technology generally has a particular effective coverage area. For example, cellular service companies often post maps of their coverage areas, and Wi-Fi is generally operable only within a certain distance from a "hotspot" or network extender. Within a particular coverage area, there could be different zones having different levels of service. For example, a cellular service might have zones that support 5G service, zones that support 4G/LTE service, zones that support 3G service, etc. Of course, wireless communications can be affected by numerous factors, e.g., location and movement of the mobile communication device, weather, network usage and congestion, electromagnetic interference, intervening materials (e.g., walls, pipes, wires, metal, etc.), power and network outages, remaining battery power of the mobile communication device, etc.

Thus, there can be "dead zones" where connectivity using a particular wireless data communication technology is unavailable or diminished (e.g., available but at a reduced data rate). Such dead zones may change over time, and a mobile computing device may physically or virtually move into and out of dead zones as it is being moved or as the dead zones change (e.g., even a stationary mobile communication device could experience a dead zone change). Some mobile computing devices can switch, or be switched, between different wireless communication technologies in an attempt to maintain connectivity in the presence of dead zones (e.g., a device may switch to cellular service when Wi-Fi connectivity is lost or falls below an acceptable service level). Under some conditions, a device may lose all wireless communication connectivity for some amount of time. And, of course, mobile communication devices can be subjected to other types of outages, e.g., losing Internet or other connectivity unrelated to the wireless communication technology per se.

When in a dead zone, users often will work "offline," e.g., using locally-stored applications and data that either happens to be on the mobile computing device or may have been intentionally downloaded in advance, e.g., for the purpose of working offline (e.g., on a airplane) or to "hedge" against possible loss of connectivity. Once connectivity is restored, the user often must manually "synchronize" work that was done offline with work on a remote system or in some cases can use tools that automatically perform such synchronization. In any case, it is usually less desirable to work offline than to work online. And if the required applications and data are not on the mobile computing device, then the user has limited if any ability to even do the offline work.

SUMMARY OF VARIOUS EMBODIMENTS

In accordance with one embodiment of the invention, a method, system and computer program product for generating wireless coverage maps includes receiving, for each of a plurality of mobile devices communicating wirelessly with a server system, mobile device location information and mobile device communication service information; generating a dead zone volume map based on the mobile device location information and the mobile device communication service information, the dead zone volume map defining a dead zone volume for a wireless communication service; and generating a dead zone geofence boundary volume map based on the dead zone volume map, the dead zone geofence boundary volume map defining a geofence boundary relative to the dead zone volume and further defining a buffer zone between at least a portion of the geofence boundary and at least a portion of the dead zone volume, the buffer zone defining a zone in which the wireless communication service is available for at least one of the mobile devices.

Embodiments can be applied to a wide variety of wireless communication services including, without limitation, a cellular wireless communication service or a WiFi wireless communication service. Embodiments can be applied to a wide range of server systems including, without limitation, enterprise asset management systems. The buffer zone may be based on an amount of data to be transmitted to a mobile device prior to entering the dead zone volume. The dead zone volume map and/or the dead zone geofence boundary volume map may be generated using AI/ML. The dead zone volume may be a three-dimensional volume.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

FIG. 12 is a logic flow diagram for synchronization and resynchronization based on changes in a dead zone geofence, in accordance with various embodiments.

Figure 1:
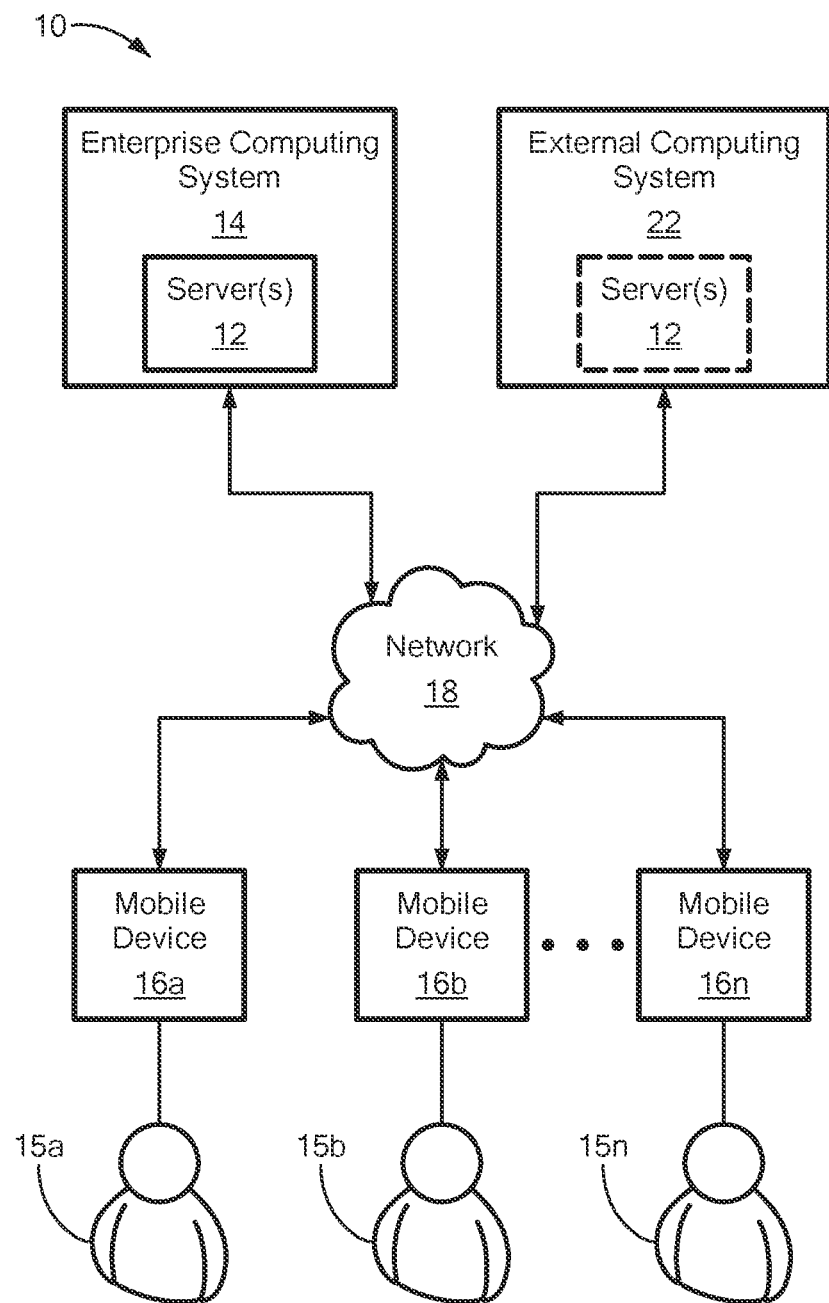
FIG. 1 is a schematic block diagram illustrating one embodiment of an exemplary system consistent with the present disclosure.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Definitions. As used in this description and the accompanying claims, the following terms shall have the meanings indicated, unless the context otherwise requires.

A "set" includes one or more members, even if the set description is presented in the plural (e.g., a set of Xs can include one or more X).

The term "dead zone" is a generic term used to describe the phenomenon where a data communication service is unavailable or diminished (e.g., available but at a reduced data rate) at a particular location such as for one or more mobile devices using a particular communication technology for a particular purpose. For example, a dead zone may relate to a particular wireless communication technology (e.g., cellular, WiFi, etc.), to a particular communication service (e.g., a particular mobile device might have a good WiFi signal but no Internet access, which could be considered an Internet dead zone although not a WiFi dead zone), to a particular mobile device or set of mobile devices (e.g., different mobile devices, mobile device brands, or mobile device models may have different communication performance characteristics and therefore may experience different dead zones), to a particular application running on a mobile device (e.g., communication services might be sufficient for general Internet access but not for operation of an enterprise Virtual Private Network required to access certain documents or services, which could be considered a dead zone for the VPN application), etc. A location associated with a dead zone may be a physical or virtual location (e.g., a network coverage area, a GPS location, an address, a building, a geographical area, a geopolitical area, etc.) and also could include other parameters such as altitude, floor of a building (e.g., coverage in an attic versus a basement), vehicle, etc. Dead zones may be actual dead zones (e.g., no signal or service is available), perceived dead zones (e.g., a signal is available but for some reason is not usable or sufficiently usable by a particular mobile device or is not usable for a particular purpose such as Internet access), or predicted dead zones (e.g., a particular location may currently have a usable signal but is predicted to become a dead zone in the future such as based on historical information, scheduled downtime, impending weather conditions, etc.). A dead zone can be transitory (e.g., a dead zone could exist for some amount of time due to a transitory condition such as weather, interference, etc.) or non-transitory (e.g., a particular communication technology might not be provided or otherwise available at a particular location). Any criteria can be used to characterize a dead zone, e.g., wireless signal strength, data rates, error rates, congestion status, service cost, etc.

A "coverage map" is a generic term for a correlation of one or more locations with one or more dead zones. A coverage map can be established using any manner of tracking or correlating one or more locations with one or more dead zones. For example, locations can be one-dimensional (e.g., at a particular GPS coordinate, address, etc.), two-dimensional (e.g., within a particular area or zone, or three-dimensional (e.g., taking into account altitude, floors of a building, etc.). A coverage map can be static (e.g., representing a particular dead zone at a particular time) or dynamic (e.g., dynamically updated as dead zones change). A coverage map can be stored in any suitable manner and is not required to be relative to a visual map.

A "module" is a generic term used to describe a set of system components configured to perform one or more described system operations. Without limitation, a module may be implemented using software, firmware, hardware, or any combination thereof, and therefore may include one or more processors and/or hardware components (e.g., application-specific integrated circuits). A module can be distributed, e.g., across multiple processors that include multiple system such as enterprise systems, cloud-based systems, third-party systems, etc.

Certain embodiments automatically identify and track actual, perceived, and/or predicted dead zones both for specific communication technologies (e.g., cellular dead zones, WiFi dead zones, etc.) and/or for one or more mobile devices or services in the aggregate (e.g., different mobile devices may experience different dead zones at a particular location even using the same communication technology, a particular mobile device may be approaching a zone where it will have no communication connectivity, a particular mobile device Y may be on an airplane about to take-off and lose service, etc.). Data from various sources is used to characterize and track coverage, develop coverage/dead zones (e.g., using AI/ML automatic generation), and take remedial actions such as synchronizing and resynchronizing data assets for offline usage.

FIG. 1 illustrates one embodiment of an exemplary system 10 consistent with the present disclosure. As shown, the system 10 includes one or more servers 12 that, for example, may run on an enterprise computing system 14 and/or an external computing system 22 (e.g., a cloud-based computing system). For convenience, the one or more servers 12 running on one or more computing systems 14, 22 can be referred to collectively as a server system 12. It should be noted that the term "server" is used herein broadly to mean any computing device or system that can perform the types of operations discussed herein and is not limited, for example, to a physical or virtual server computer.

The system 10 also includes one or more mobile computing devices 16(a)-16(n), which, for convenience, may be referred to herein individually as a mobile device 16 or collectively as mobile devices 16. Each mobile device 16(a)-16(n) is generally associated with a corresponding user 15(a)-15(n), who, for convenience, may be referred to herein individually as a user 15 or collectively as users 15, although it should be noted that certain mobile devices 16 may be unrelated to a specific user 15 (e.g., a mobile device 16 may operate autonomously or may be associated with a non-user entity such as a company, vehicle, etc.). In the present context, the users 15 may include administrators, customers, developers, or clients of a service provided by the server system 12. The users 15 may also include particular persons to which the service is directed.

The server system 12 is configured to communicate and share data with one or more user mobile devices 16 over a network 18, and, conversely, the mobile devices 16 are configured to communicate and share data with the server system 12 via the network 18, which can include data entered by users 15, data from any of various applications running on the user mobile devices 16, and data generated by the user mobile devices 16 themselves (e.g., location/GPS data). In addition, or alternatively, the mobile devices 16 may be configured to communicate with one another via the network 18 and/or other network (e.g., a particular mobile device may communicate with the server system 12 via the network 18 but communicate with another mobile device via a different network).

The network 18 may be or include any network that carries data. Non-limiting examples of suitable networks that may be used in whole or in part as network 18 include a private or non-private local area network (LAN), personal area network (PAN), storage area network (SAN), backbone network, global area network (GAN), wide area network (WAN), metropolitan area network (MAN), virtual private networks (VPN), or collection of any such communication networks such as an intranet, extranet or the Internet (i.e., a global system of interconnected networks upon which various applications or service run including, for example, the World Wide Web). The user mobile devices 16 generally communicate with the server system 12 over a wireless communication system that can include any suitable wireless communication technology. Non-limiting examples of suitable wireless communication technologies include various cellular-based data communication technologies (e.g., 2G, 3G, 4G, LTE, 5G, GSM, etc.), Wi-Fi wireless data communication, wireless LAN communication technology (e.g., 802.11), Bluetooth wireless data communication, Near Field Communication (NFC) wireless communication, other networks or protocols capable of carrying data, and combinations thereof. In some embodiments, network 18 is chosen from the internet, at least one wireless network, at least one cellular communication network, and combinations thereof. As such, the network 18 may include any number of additional devices, such as additional computers, routers, and switches, to facilitate communications. In some embodiments, the network 18 may be or include a single network, and in other embodiments the network 18 may be or include a collection of networks.

The server system 12 is configured to communicate and share data with the mobile devices 16 associated with one or more users 15. Accordingly, the mobile device 16 may be embodied as any type of device for communicating with the server system 12 and/or other mobile devices over the network 18. For example, at least one of the mobile devices may be embodied as, without limitation, a computer, a desktop computer, a personal computer (PC), a tablet computer, a laptop computer, a notebook computer, a mobile computing device, a smart phone, a cellular telephone, a handset, a messaging device, a work station, a distributed computing system, a multiprocessor system, a processor-based system, and/or any other computing device configured to store and access data, and/or to execute software and related applications consistent with the present disclosure.

Figure 2:
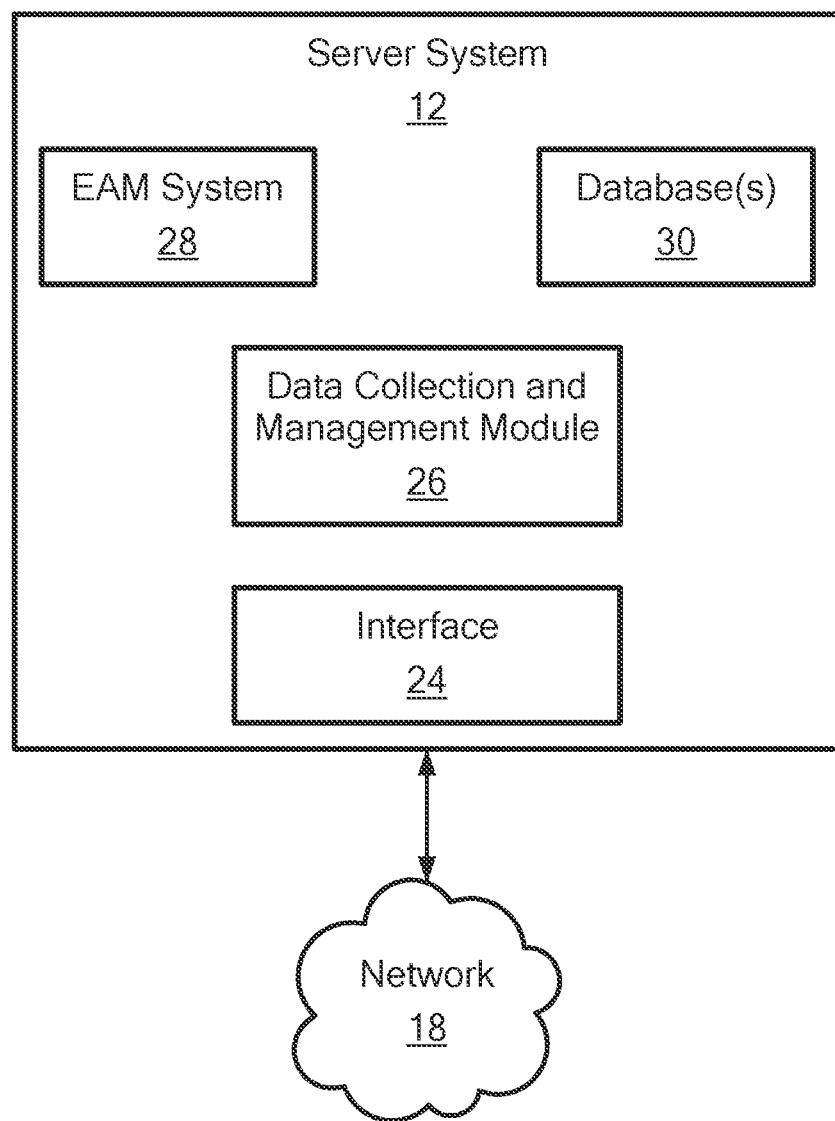
FIG. 2 is a schematic block diagram illustrating the server system of FIG. 1 in greater detail.

FIG. 2 is a block diagram illustrating the server system 12 in greater detail. As shown, the server system 12 may include an interface 24, a data collection and management module 26, an enterprise asset management (EAM) system 28, and one or more databases 30 to store data from any of a variety of sources that can include, without limitation, data related to one or more users 15, data related to one or more user mobile devices 16, data related to one or more applications running on a user mobile device 16, data related to one or more applications running on the server system 12, data obtained from other sources over the network 18 (e.g., over the Internet), etc.

Figure 3:
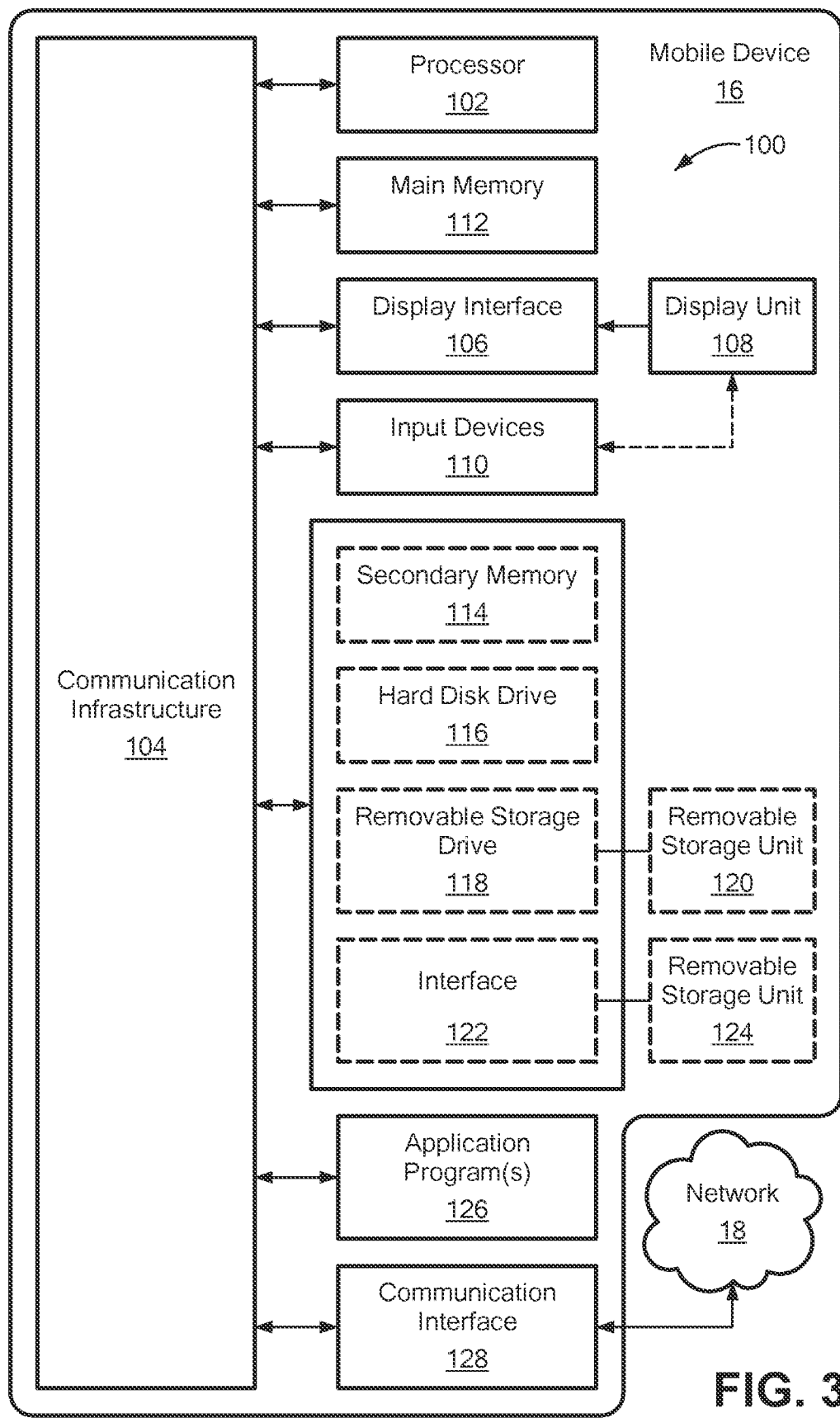
FIG. 3 is a schematic block diagram illustrating at least one embodiment of a mobile device consistent with the present disclosure.

FIG. 3 is a block diagram illustrating at least one embodiment of a mobile device 16 consistent with the present disclosure. The mobile device 16 generally includes a computing system 100. As shown, the computing system 100 may include one or more processors, such as processor 102. Processor 102 is operably connected to communication infrastructure 104 (e.g., a communications bus, cross-over bar, or network). The processor 102 may be embodied as any type of processor capable of performing the functions described herein. For example, the processor may be embodied as a single or multi-core processor(s), digital signal processor, microcontroller, or other processor or processing/controlling circuit.

The computing system 100 further includes a display interface 106 that forwards graphics, text, sounds, and other data from communication infrastructure 104 (or from a data buffer not shown) for display on display unit 108. The computing system further includes input devices 110. The input devices 110 may include one or more devices for interacting with the mobile device 16, such as a keypad, microphone, camera, as well as other input components, including motion sensors, and the like. In one embodiment, the display unit 108 may include a touch-sensitive display (also known as "touch screens" or "touchscreens"), in addition to, or as an alternative to, physical push-button keyboard or the like. The touch screen may generally display graphics and text, as well as provides a user interface (e.g., but not limited to graphical user interface (GUI)) through which a user may interact with the mobile device 16, such as accessing and interacting with applications executed on the device 16.

The computing system 100 further includes main memory 112, such as random access memory (RAM), and may also include secondary memory 114. The main memory 112 and secondary memory 114 may be embodied as any type of device or devices configured for short-term or long-term storage of data such as, for example, memory devices and circuits, memory cards, hard disk drives, solid-state drives, or other data storage devices. Similarly, the memory 112, 114 may be embodied as any type of volatile or non-volatile memory or data storage capable of performing the functions described herein.

In the illustrative embodiment, the mobile device 16 may maintain one or more application programs, databases, media, and/or other information in the main and/or secondary memory 112, 114. The secondary memory 114 may include, for example, a hard disk drive 116 and/or removable storage drive 118, representing a floppy disk drive, a magnetic tape drive, an optical disk drive, etc. Removable storage drive 118 reads from and/or writes to removable storage unit 120 in any known manner. The removable storage unit 120 may represents a floppy disk, magnetic tape, optical disk, etc. which is read by and written to by removable storage drive 118. As will be appreciated, removable storage unit 120 includes a computer usable storage medium having stored therein computer software and/or data.

In alternative embodiments, the secondary memory 114 may include other similar devices for allowing computer programs or other instructions to be loaded into the computing system 100. Such devices may include, for example, a removable storage unit 124 and interface 122. Examples of such may include a program cartridge and cartridge interface (such as that found in video game devices), a removable memory chip (such as an erasable programmable read only memory (EPROM), or programmable read only memory (PROM)) and associated socket, and other removable storage units 124 and interfaces 122, which allow software and data to be transferred from removable storage unit 124 to the computing system 100.

The computing system 100 further includes one or more application programs 126 directly stored thereon. The application program(s) 126 may include any number of different software application programs, each configured to execute a specific task.

The computing system 100 further includes a communications interface 128. The communications interface 128 may be embodied as any communication circuit, device, or collection thereof, capable of enabling communications between the mobile device 16 external devices (other mobile devices 16, the cloud-based service 14, and the external computing system/server 22). The communications interface 128 may be configured to use any one or more communication technology and associated protocols, as described above, to effectuate such communication. For example, the communications interface 128 may be configured to communicate and exchange data with the server 12, the external computing system/server 22 and/or one other mobile device 16 via a wireless transmission protocol including, but not limited to, Bluetooth communication, infrared communication, near field communication (NFC), radio-frequency identification (RFID) communication, cellular network communication, versions of IEEE 802.11 transmission protocol standards, and a combination thereof. Examples of communications interface 228 may include a modem, a network interface (such as an Ethernet card), a communications port, a Personal Computer Memory Card International Association (PCMCIA) slot and card, wireless communication circuitry, etc.

Computer programs (also referred to as computer control logic) may be stored in main memory 112 and/or secondary memory 114 or a local database on the mobile device 16. Computer programs may also be received via communications interface 128. Such computer programs, when executed, enable the computing system 100 to perform the features of the present invention, as discussed herein. In particular, the computer programs, including application programs 126, when executed, enable processor 102 to perform the features of the present invention. Accordingly, such computer programs represent controllers of computer system 100.

In one embodiment where the invention is implemented primarily in software, the software may be stored in a computer program product and loaded into the computing system 100 using removable storage drive 118, hard drive 116 or communications interface 128. The control logic (software), when executed by processor 102, causes processor 102 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

The EAM system 28 generally provides a mobile solution that allows asset management users to perform their work remotely, such as at home, at customer sites, in vehicles, and in other remote locations. Generally speaking, users use mobile devices (e.g., smartphones or tablets) to access asset management services through a cellular or Wi-Fi network. For example, such asset management services can include remote access to electronic documents, files, applications, and other information that may be stored in database(s) 30 or otherwise available from the EAM system 28.

As discussed above, it is not uncommon for mobile devices 16 to encounter dead zones such as in rural areas, plant remote areas, areas with high density of metal or other interference, etc. Therefore, the Workflow Module 34 provides offline capabilities that allow users to manually download selected data to their devices, work offline in a dead zone, and synchronize the offline work back into the system when the user is no longer in the dead zone. In essence, the users must determine that a dead zone is impending, manually determine what data is needed on their mobile devices 16, manually initiate data downloads to their mobile devices 16 sufficiently in advance of entering the dead zone, and then manually resynchronize their work after leaving the dead zone.

Therefore, in certain embodiments, the EAM system 28 automatically identifies and maps dead zones, manages workflows that could be affected by dead zones (e.g., by identifying assets and information that could be needed for offline work in a dead zone), triggers remedial actions (e.g., providing notifications to a user as the user approaches a dead zone or a dead zone approaches a user, automatically downloading data that will be needed for offline work on a particular mobile device 16, automatically switching communication technologies in order to maintain or extend communication connectivity, automatically saving or uploading work product prior to loss of communication connectivity, etc.), and triggers resynchronization of offline work with corresponding information on the EAM system 28 when the mobile device 16 is out of the dead zone and back online. Among other things, embodiments will make the online and offline EAM mobile solutions automatically work as a seamless, self-learning unified solution that can adapt to unique communication coverage situations by anticipating dead zones and assets associated with dead zones and automatically initiating data download and synchronization. Data download and synchronization can be automatically triggered based on configurable elements such as, for example, user geolocation, past work history, user skills, asset location, geospatial data communication coverage (e.g., how many "bars" there are at any given time), current proximity to weak reception areas, dead-zone geometry, time of the day, weather conditions, etc.

Figure 4:
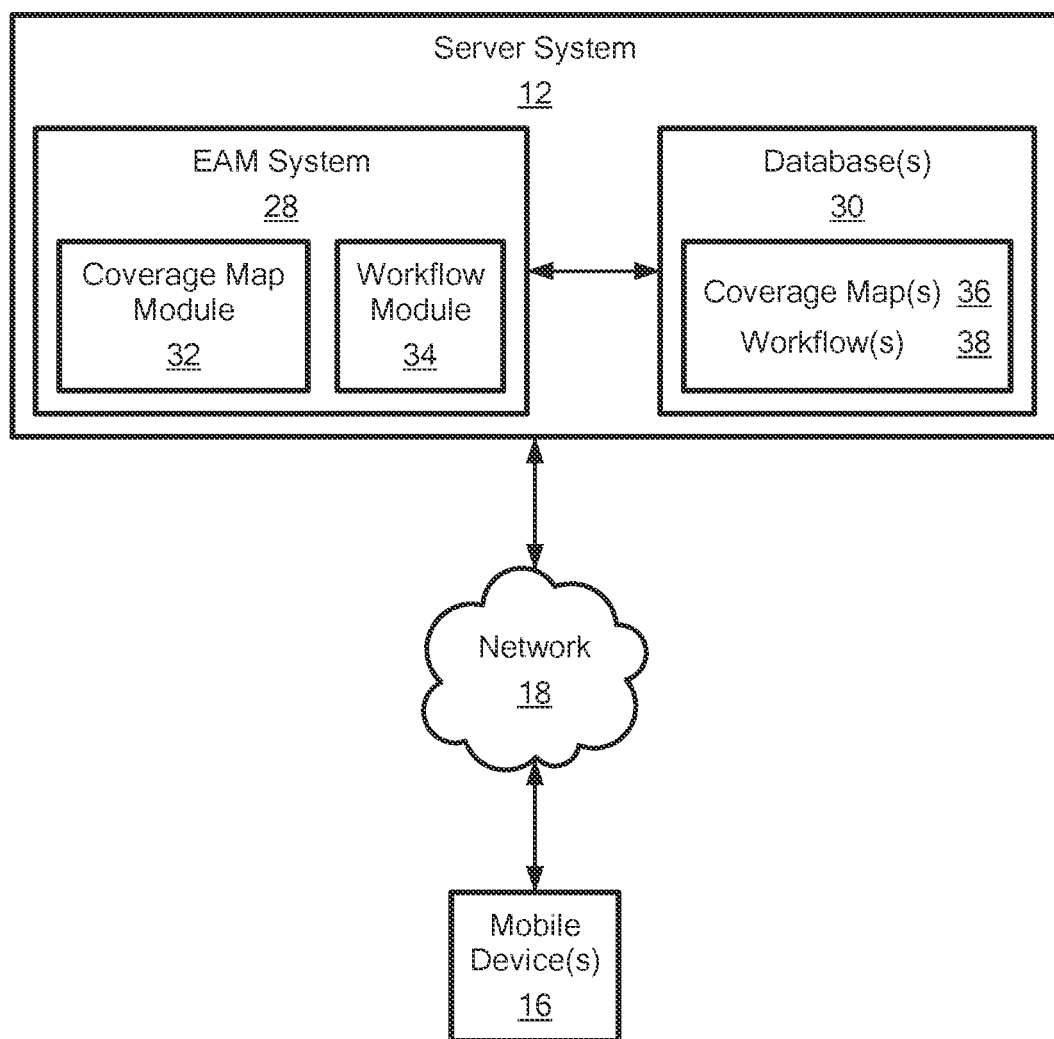
FIG. 4 is a schematic block diagram illustrating at least one embodiment of an enterprise asset management (EAM) system consistent with the present disclosure.

FIG. 4 is a block diagram illustrating at least one embodiment of an EAM system 28 consistent with the present disclosure. Among other things, the EAM system 28 logically includes a Coverage Map Module 32 and a Workflow Module 34. Generally speaking, the Coverage Map Module 32 identifies, tracks, and maps dead zones based on information collected from mobile devices 16 and other sources (e.g., from the Internet, from other components of the EAM system 28, from subscription services, from third-party systems, from streamed data, from historical data, etc.) and stores one or more coverage maps 36 in database(s) 30. Generally speaking, the Workflow Module 34 manages workflows (e.g., scheduling and rescheduling) that can involve any of various assets required at a particular location/time (e.g., personnel, documents, files, equipment, resources, third-party contractors and services, etc.) and stores workflow information 38 in the database(s) 30. These elements are discussed in greater detail below.

Figure 5:
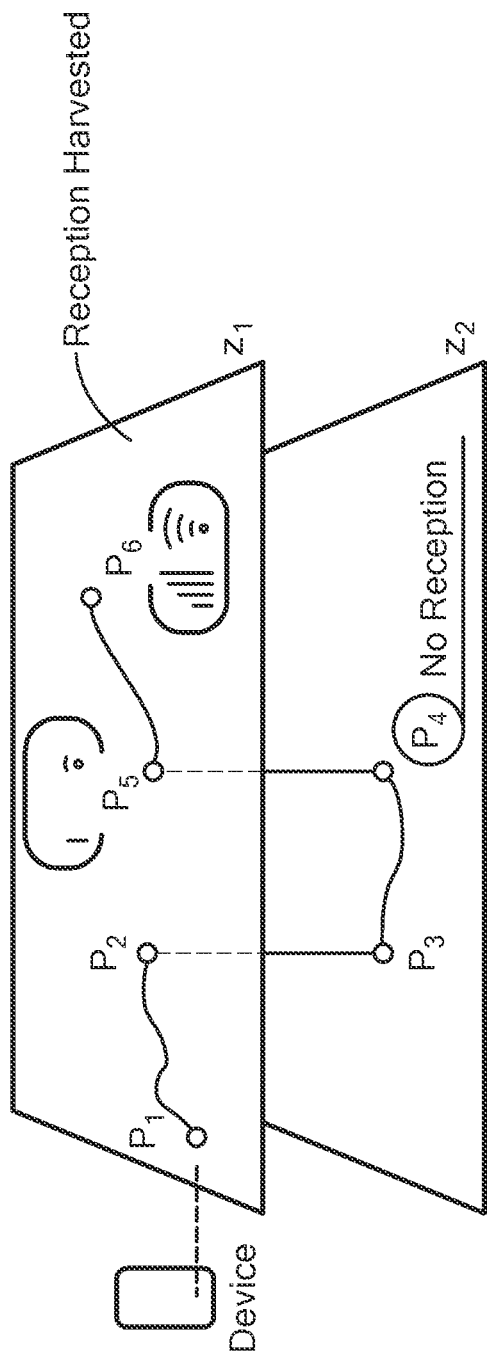
FIG. 5 is a schematic diagram illustrating a data harvesting process consistent with the present disclosure.

Among other things, the Coverage Map Module 32 performs a data harvesting process by which it collects and records time-series data from the mobile devices 16 (e.g., geolocation information, communication information such as availability and reception characteristics, etc.) and optionally also other information sources (e.g., weather information, historical information, predictive analytics, etc.). FIG. 5 is a schematic diagram of a data harvesting process consistent with the present disclosure. In this example, mobile device measurements $P_1$-$P_n$ including such things as mobile device location and reception characteristics (e.g., communication technology, signal strength, data rate, error rate, etc.) are recorded at each of a number of times $t_1$-$t_n$. Here, measurement P4 shows no reception, measurement P5 shows poor reception (e.g., one bar), and measurement P6 shows good reception (e.g., three bars).

The data harvesting process can collect and record other data relevant to communication coverage such as, for example, weather data, geographical maps, building maps, service coverage maps, and other data. Such data can be correlated with the time-series data. For example, weather data can be used to evaluate weather-related impacts in coverage (e.g., a particular area might lose coverage during certain types of storms), geographical data can be used to evaluate topography-related impacts in coverage (e.g., impacts due to elevation, topographical features such as hills or valleys, etc.), building data can be used to evaluate building-related impacts in coverage (e.g., impacts due to walls, wiring, plumbing, etc.), etc.

Figure 6:
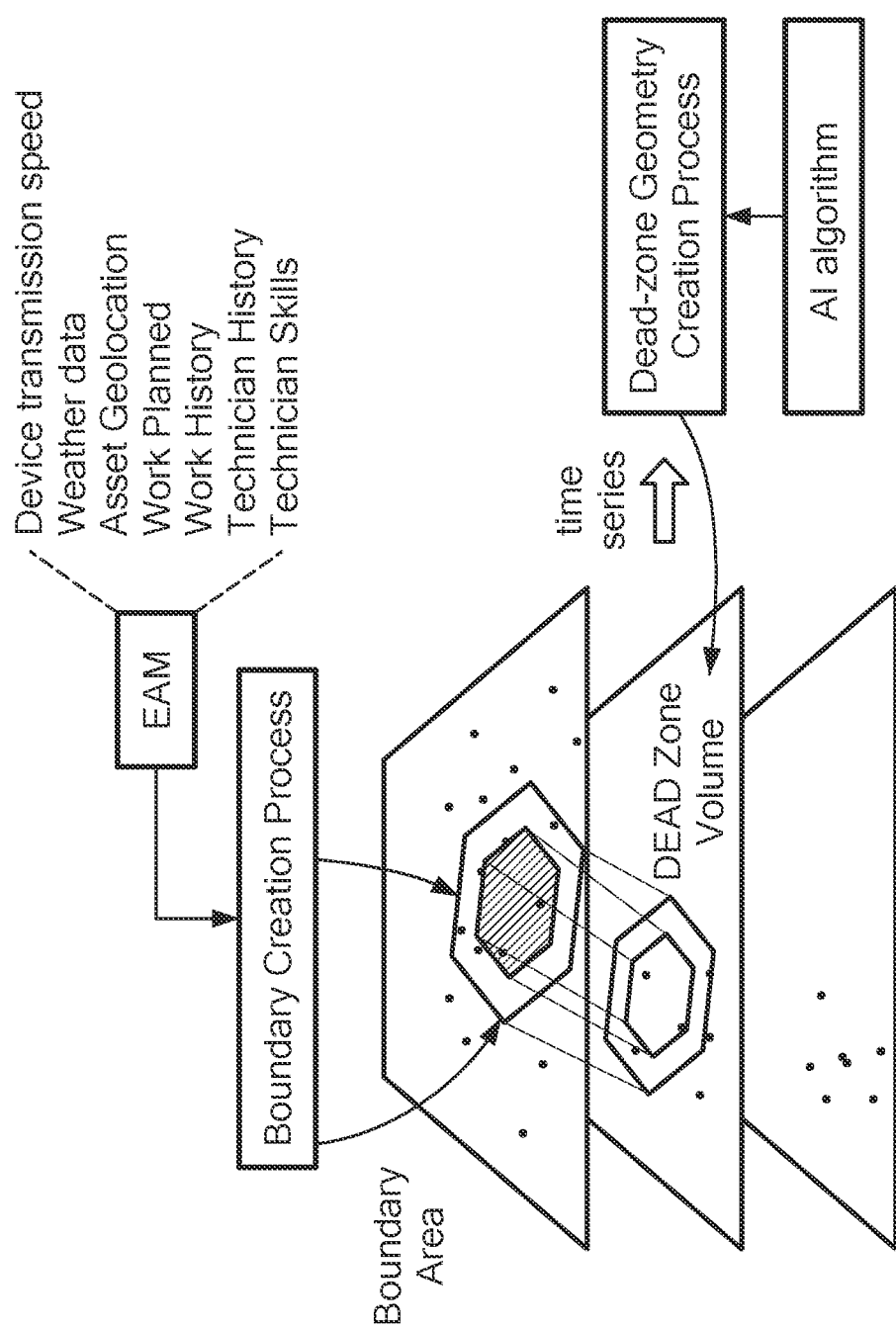
FIG. 6 is a schematic diagram illustrating a dead zone geometry generation process and a boundary creation process consistent with the present disclosure.

As depicted schematically in FIG. 6, the time-series data can be used alone or with other data by a dead zone geometry generation process of the Coverage Map Module 32 to create and store a dead zone volume map, which, in the context of the present patent application, can be considered a type of coverage map 36. A dead zone volume map is generally a three-dimensional map of a dead zone (e.g., taking into account such things as altitude, building floors, etc.) although a dead zone volume map could be two-dimensional (e.g., an area) or even one-dimensional (e.g., a particular location, address, GPS coordinate, etc.). As suggested above, a dead zone volume map can relate, for example, to a particular communication technology, to a particular mobile device or set of mobile devices, or to a particular location or site. The dead zone geometry generation process can utilize Artificial Intelligence/Machine Learning (AI/ML) problem solving systems to generate dead zone volume maps, e.g., by running multiple parallel AI/ML algorithms to determine actual, perceived, or predicted dead zones. For example, dead zones can be predicted from historical information such as weather patterns, time-of-day variations in wireless services, etc. Such AI/ML problem solving systems may be integrated into the EAM system 28 or may be accessed remotely such as through cloud-based services. Exemplary AI/ML problem solving systems that can be utilized by the dead zone geometry generation process are incorporated by reference above.

Also as depicted schematically in FIG. 6, one or more dead zone volume maps can be used alone or with other information by a boundary creation process of the Coverage Map Module 32 to generate a dead zone geofence boundary volume map, which, in the context of the present patent application, can be considered a type of coverage map 36. A dead zone geofence boundary volume map generally encompasses one or more dead zone volume maps produced by the dead zone volume geometry generation process and also can include a buffer zone around the dead zone(s). A buffer zone could account for such things as assets that will be needed for offline work in the dead zone, assets that need to be saved before entering the dead zone, the amount of data associated that needs to be communicated such as for uploading or downloading data, the data rate(s) available, the amount of time needed to communicate the data, the amount of time before the mobile device is expected to enter the dead zone (e.g., based on location, rate of travel, course of travel, changes in dead zone volumes, etc.), and other information. Assets affected by the dead zone can be determined from a variety of information sources such as, for example, asset geospatial location, work geospatial location, work history (e.g., determining the types of data that might be needed in the dead zone based on data that has been used in the past), work planned (e.g., determining the types of data needed based on work that is planned to be done in the dead zone), work skills required (e.g., if a novice technician will be working in the dead zone, then additional assets such as instructional manuals or videos might be needed since the technician will not have access to such assets while in the dead zone), etc. As above, the boundary creation process can utilize Artificial Intelligence/Machine Learning (AI/ML) problem solving systems to generate dead zone geofence boundary volume maps, e.g., by running multiple parallel AI/ML algorithms to determine geofence boundary volumes for different potential scenarios.

It should be noted that some of the information used by the Coverage Map Module 32 can come from the Workflow Module 34. As mentioned above, the Workflow Module 34 manages workflows (e.g., scheduling and rescheduling) that can involve any of various assets required at a particular location/time (e.g., personnel, documents, files, equipment, resources, third-party contractors and services, etc.) and stores workflow information 38 in the database(s) 30. As such, the Workflow Module 34 can generate various types of data that in turn can be used by the Coverage Map Module 32 to generate dead zone volume maps and dead zone geofence boundary volume maps. For example, the Workflow Module 34 could schedule a particular user 15 associated with a particular mobile device 16 to perform various types of work requiring various assets at various locations at various times, and all of such scheduling information could be made available to the Coverage Map Module 32.

In any case, the boundary creation process can generate a dead zone geofence boundary volume having a buffer zone that would allow for sufficient time to initiate and complete any remedial actions such as uploading data, downloading data, or other remedial actions of the types described above, e.g., before the mobile device loses communication with the EAM system 28. For example, detection of a mobile device approaching or entering a dead zone geofence boundary volume could be used to trigger such remedial actions.

Figure 7:
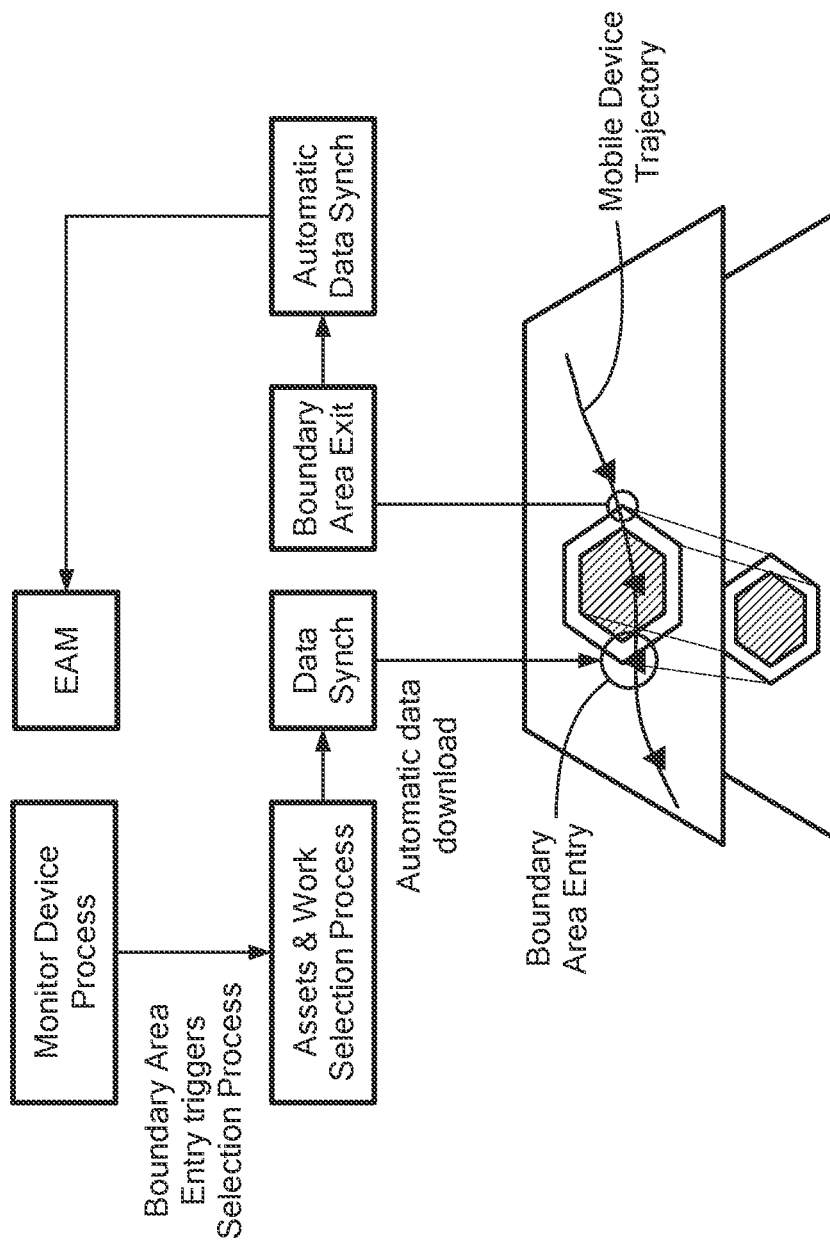
FIG. 7 is a schematic diagram illustrating a data asset synchronization and resynchronization process consistent with the present disclosure.

As depicted schematically in FIG. 7, a location monitoring process can be included to monitor the location/trajectory of mobile devices 16 associated with the EAM system 28 relative to one or more dead zone geofence boundary volume maps. When the location monitoring process determines that a mobile device 16 is approaching or entering a dead zone geofence boundary volume (e.g., based on current mobile device location, movement of the mobile device 16, intended destination, direction of travel and changes in direction of travel, rate of travel and changes in rate of travel, expected arrival time and changes in expected arrival time, and/or changes in the dead zone geofence boundary volume), the location monitoring process can automatically trigger any of various actions. For example, the location monitoring process could generate an alert (e.g., on the mobile device 16, on the EAM system 28, or through other channels such as an email or text message to the user 15) such as to warn the user 15 or other party that the mobile device 16 is approaching an area with reduced or no communications. Among other things, this might prompt the user 15 to stop (e.g., to manually download assets to the mobile device 16 before proceeding into the dead zone) or to change course (e.g., to avoid entering a dead zone). Additionally or alternatively, the location monitoring process could automatically switch communication services in order to maintain or prolong communication between the EAM system 28 and the mobile device 16. For example, if the mobile device 16 is about to lose WiFi service, then the mobile device 16 could be switched to cellular service. Additionally or alternatively, the location monitoring process could automatically trigger a data synchronization event, e.g., by downloading assets needed within the dead zone (e.g., documents, files, etc.) to the mobile device 16 so that the mobile device 16 will be able to continue working offline, with data stored locally within the mobile device 16 for later resynchronization. Thus, for example, the mobile device 16 may be at a stationary location but still may move in and out of dead zones as dead zone volumes change, e.g., due to weather or other conditions. The system could predict an upcoming outage at a particular location (e.g., due to an approaching storm or other weather condition) and take preemptive action such as initiating download/upload with sufficient time ahead of the upcoming outage.

When the location monitoring process determines that the mobile device 16 has exited the dead zone geofence boundary volume or otherwise has sufficient communication connectivity back to the EAM system 28, it can automatically trigger a data resynchronization event, e.g., by sending offline data from the mobile device 16 back to the EAM system 28. Of course, data resynchronization can include complex processes such as reconciliation of offline data with data stored in the EAM system 28.

It should be noted that the location monitoring process could be implemented in the EAM system 28. For example, the Coverage Map Module 32 or the Workflow Module 34 could monitor the location/trajectory of the mobile device 16 such as from the information harvested from the mobile device 16 and compare the location/trajectory to a dead zone geofence boundary volume map in order to trigger a data synchronization event and/or a data resynchronization event. Additionally or alternatively, the location monitoring process could be implemented in the mobile device 16. For example, the EAM system 28 could download a dead zone geofence boundary volume map to the mobile device 16, and the mobile device 16 could monitor the location/trajectory of the mobile device 16 such as from GPS or other location information (e.g., WiFi-based location) and compare the location/trajectory to the downloaded dead zone geofence boundary volume map in order to trigger a data synchronization event and/or a data resynchronization event.

Just as some of the information used by the Coverage Map Module 32 can come from the Workflow Module 34, the Workflow Module 34 can use maps generated by Coverage Map Module 32 in its workflow scheduling logic. For example, the Workflow Module 34 can use maps to avoid scheduling work in dead zones or alternatively can use maps specifically to schedule work in dead zones (e.g., to dispatch workers to install or repair communication equipment, to dispatch emergency personnel to possible disaster areas based on predicted future dead zones, etc.). In some cases, the Workflow Module 34 could reschedule workflows, e.g., if a user is supposed to go to location X and then to location Y but a temporary dead zone is expected at location X, then the system could reschedule the user to go to location Y and then to location X.

It should be noted that certain remedial actions of the types discussed above additionally or alternatively could be performed automatically based on remaining battery life of a mobile device 16. For example, in anticipation of a mobile device 16 shutting down, the mobile device 16 could automatically save any unsaved work locally on the mobile device 16 and/or to the EAM system 28, switch communication technologies in order to extend battery life, shut down unneeded applications or application features in order to extend batter life, etc.

It should be noted that some or all of the functions discussed above and identified as being performed by the Coverage Map Module 32 could be performed by the Workflow Module 34 and/or other components, and additionally or alternatively some or all of the functions discussed above and identified as being performed by the Workflow Module 34 could be performed by the Coverage Map Module 32 and/or other components.

It should be noted that aspects of dead zone mapping and usage are not limited to EAM systems or to asset management or even to synchronization/resynchronization of assets but rather can be applied more broadly in other contexts.

For one example, a location monitoring process similar to that described above could be incorporated into navigation applications such as smartphone navigation "apps" (e.g., WAZE™, Maps, etc.), web-based navigation applications (e.g., GOOGLE® Maps, MAPQUEST™, etc.), delivery/route management applications, trail mapping applications (e.g., hiking, skiing, etc.), and other navigation applications such as to assist users in avoiding dead zones and to direct users out of dead zones based on one or more dead zone geofence boundary volume maps. For example, a smartphone navigation app could provide alternate route options where a first route option might be faster but includes a dead zone and a second route option might take longer but has no dead zones, a trail mapping application could warn a hiker or skier that they are at risk of entering a dead zone where they may end up lost without communication services, etc. Similarly, information could be provided to a user regarding distance, time, and direction into or out of a dead zone.

For another example, emergency management entities (e.g., police, fire, FEMA, etc.) could use dead zone volume maps and dead zone geofence boundary volume maps to improve responses to emergencies.

For another example, entities such as businesses and advertisers could use dead zone volume maps and dead zone geofence boundary volume maps to preemptively provide information to users prior to them entering a dead zone, e.g., coupons for stores or restaurants that are located in a dead zone.

For another example, delivery services (e.g., USPS, FedEx, UPS, etc.) could use the synchronization and resynchronization services to ensure that drivers have proper delivery information prior to entering a dead zone and provide offline data back to the system to provide delivery confirmations as soon as possible after exiting a dead zone.

Figure 8:
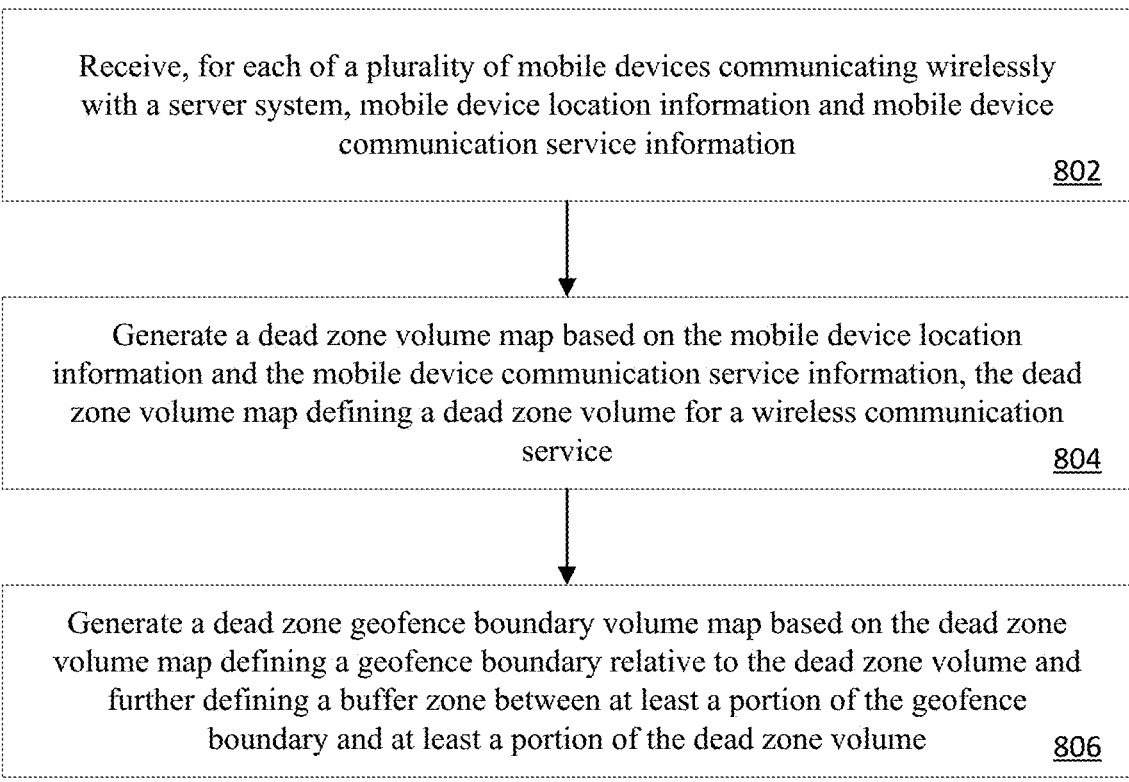
FIG. 8 is a logic flow diagram for generating wireless coverage maps, accordance with various embodiments.

FIG. 8 is a logic flow diagram for generating wireless coverage maps, accordance with various embodiments. Block 802 includes receiving, for each of a plurality of mobile devices communicating wirelessly with a server system, mobile device location information and mobile device communication service information. Block 804 includes generating a dead zone volume map based on the mobile device location information and the mobile device communication service information, the dead zone volume map defining a dead zone volume for a wireless communication service. Block 806 includes generating a dead zone geofence boundary volume map based on the dead zone volume map, the dead zone geofence boundary volume map defining a geofence boundary relative to the dead zone volume and further defining a buffer zone between at least a portion of the geofence boundary and at least a portion of the dead zone volume, the buffer zone defining a zone in which the wireless communication service is available for at least one of the mobile devices. Embodiments can be applied to a wide variety of wireless communication services including, without limitation, a cellular wireless communication service or a WiFi wireless communication service. Embodiments can be applied to a wide range of server systems including, without limitation, enterprise asset management systems. The buffer zone may be based on an amount of data to be transmitted to a mobile device prior to entering the dead zone volume. The dead zone volume map and/or the dead zone geofence boundary volume map may be generated using AI/ML. The dead zone volume may be a three-dimensional volume.

Figure 9:
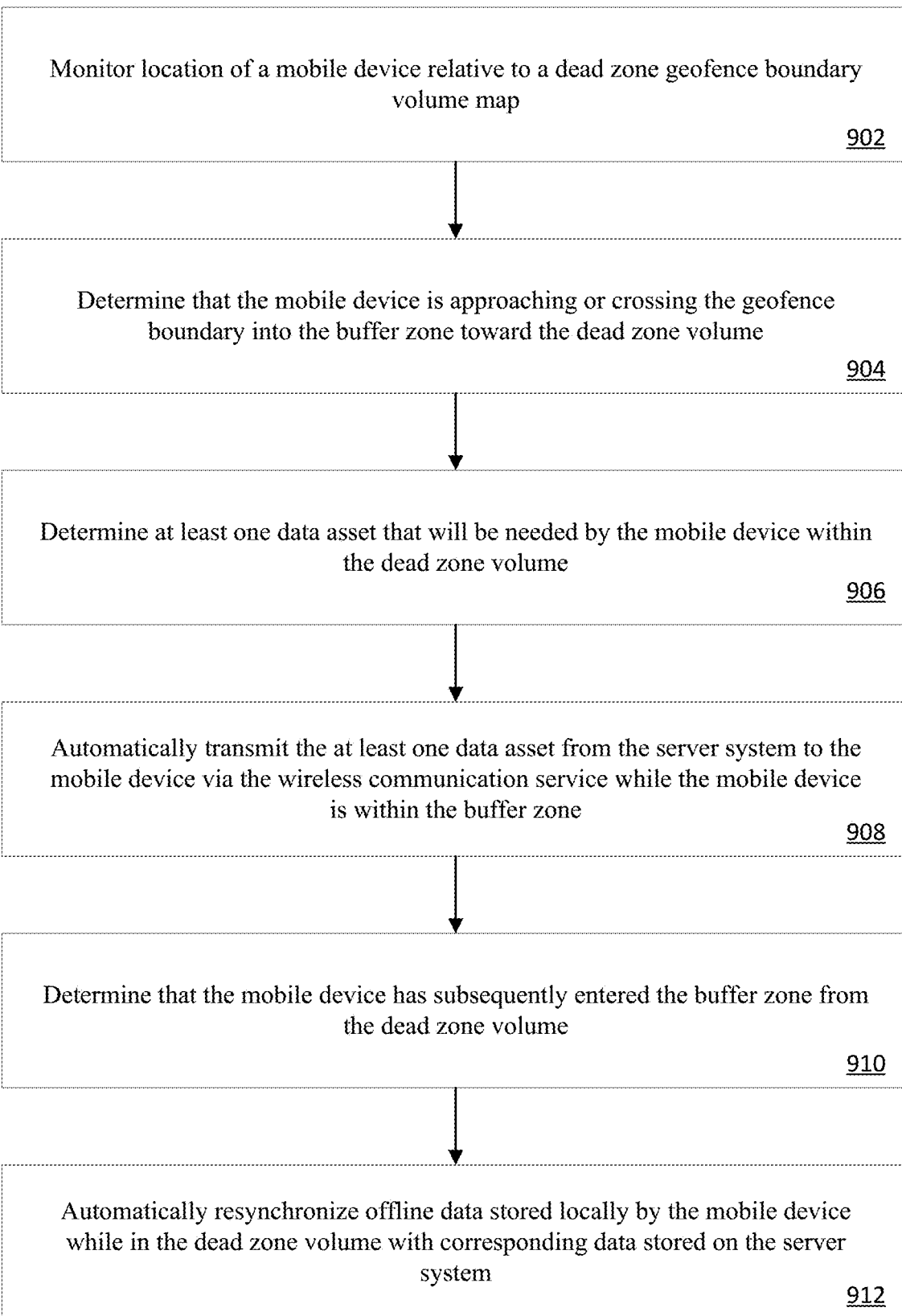
FIG. 9 is a logic flow diagram for synchronization and resynchronization based on entering a dead zone geofence, in accordance with various embodiments.

FIG. 9 is a logic flow diagram for synchronization and resynchronization based on entering a dead zone geofence, in accordance with various embodiments. Block 902 includes monitoring location of a mobile device relative to a dead zone geofence boundary volume map including a geofence boundary, a dead zone volume associated with a wireless communication service, and a buffer zone between at least a portion of the geofence boundary and at least a portion of the dead zone volume, the buffer zone defining a zone in which the wireless communication service is available for the mobile device to communicate with a server system. Block 904 includes determining that the mobile device is approaching or crossing the geofence boundary into the buffer zone toward the dead zone volume. Block 906 includes determining at least one data asset that will be needed by the mobile device within the dead zone volume. Block 908 includes automatically transmitting the at least one data asset from the server system to the mobile device via the wireless communication service while the mobile device is within the buffer zone. Block 910 includes determining that the mobile device has subsequently entered the buffer zone from the dead zone volume. Block 912 includes automatically resynchronizing offline data stored locally by the mobile device while in the dead zone volume with corresponding data stored on the server system. Embodiments can be applied to a wide variety of wireless communication services including, without limitation, a cellular wireless communication service or a WiFi wireless communication service. Embodiments can be applied to a wide range of server systems including, without limitation, enterprise asset management systems. The buffer zone may be based on an amount of data associated with the at least one data asset and/or may be based on a data rate available within the buffer zone. The dead zone volume may be a three-dimensional volume.

Figure 10:
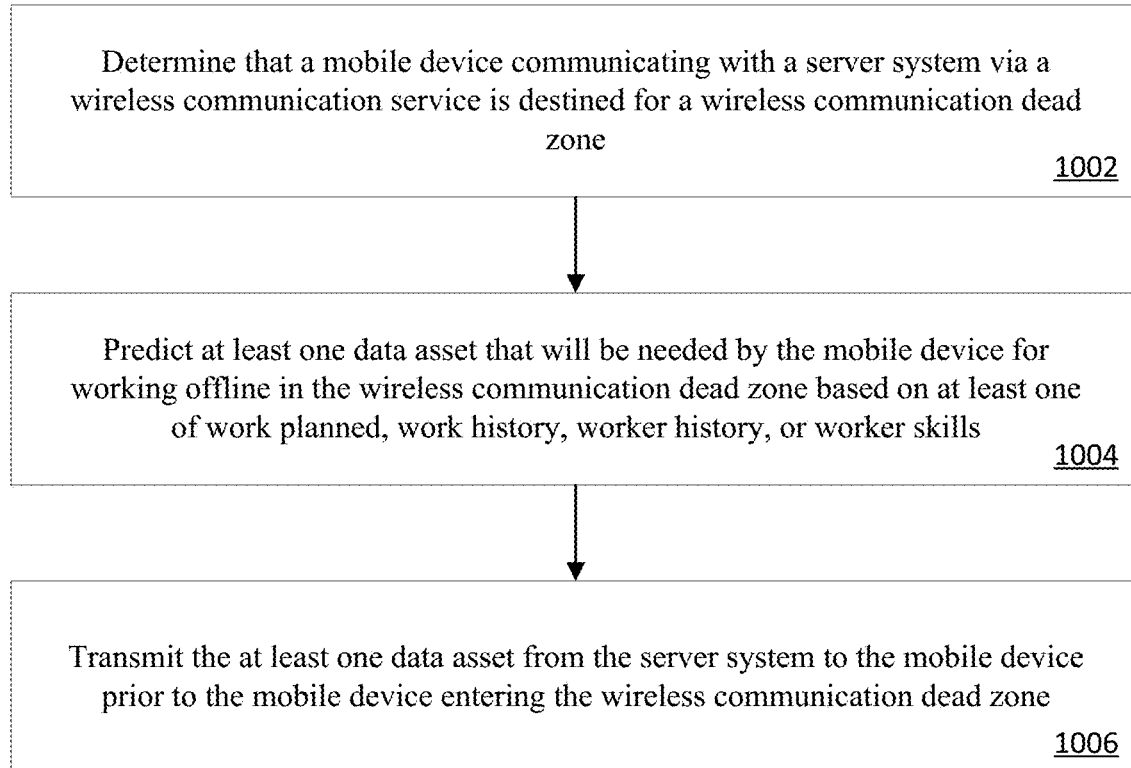
FIG. 10 is a logic flow diagram for identifying assets needed in a dead zone, in accordance with various embodiments.

FIG. 10 is a logic flow diagram for identifying assets needed in a dead zone, in accordance with various embodiments. Block 1002 includes determining that a mobile device communicating with a server system via a wireless communication service is destined for a wireless communication dead zone. Block 1004 includes predicting at least one data asset that will be needed by the mobile device for working offline in the wireless communication dead zone based on at least one of work planned, work history, worker history, or worker skills. Block 1006 includes transmitting the at least one data asset from the server system to the mobile device prior to the mobile device entering the wireless communication dead zone. Embodiments can be applied to a wide variety of wireless communication services including, without limitation, a cellular wireless communication service or a WiFi wireless communication service. Embodiments can be applied to a wide range of server systems including, without limitation, enterprise asset management systems. Transmitting the at least one data asset from the server system to the mobile device prior to the mobile device entering the wireless communication dead zone may involve determining an amount of data to be transmitted; determining an amount of transmission time based on the amount of data and a data rate available from the wireless communication service; determining an amount of time for the mobile device to enter the wireless communication dead zone; and beginning transmission of the at least one data asset such that transmitting the at least one data asset from the server system to the mobile device completes before the mobile device enters the wireless communication dead zone. The at least one data asset may be predicted using AI/ML. The wireless communication dead zone may be a three-dimensional volume.

Figure 11:
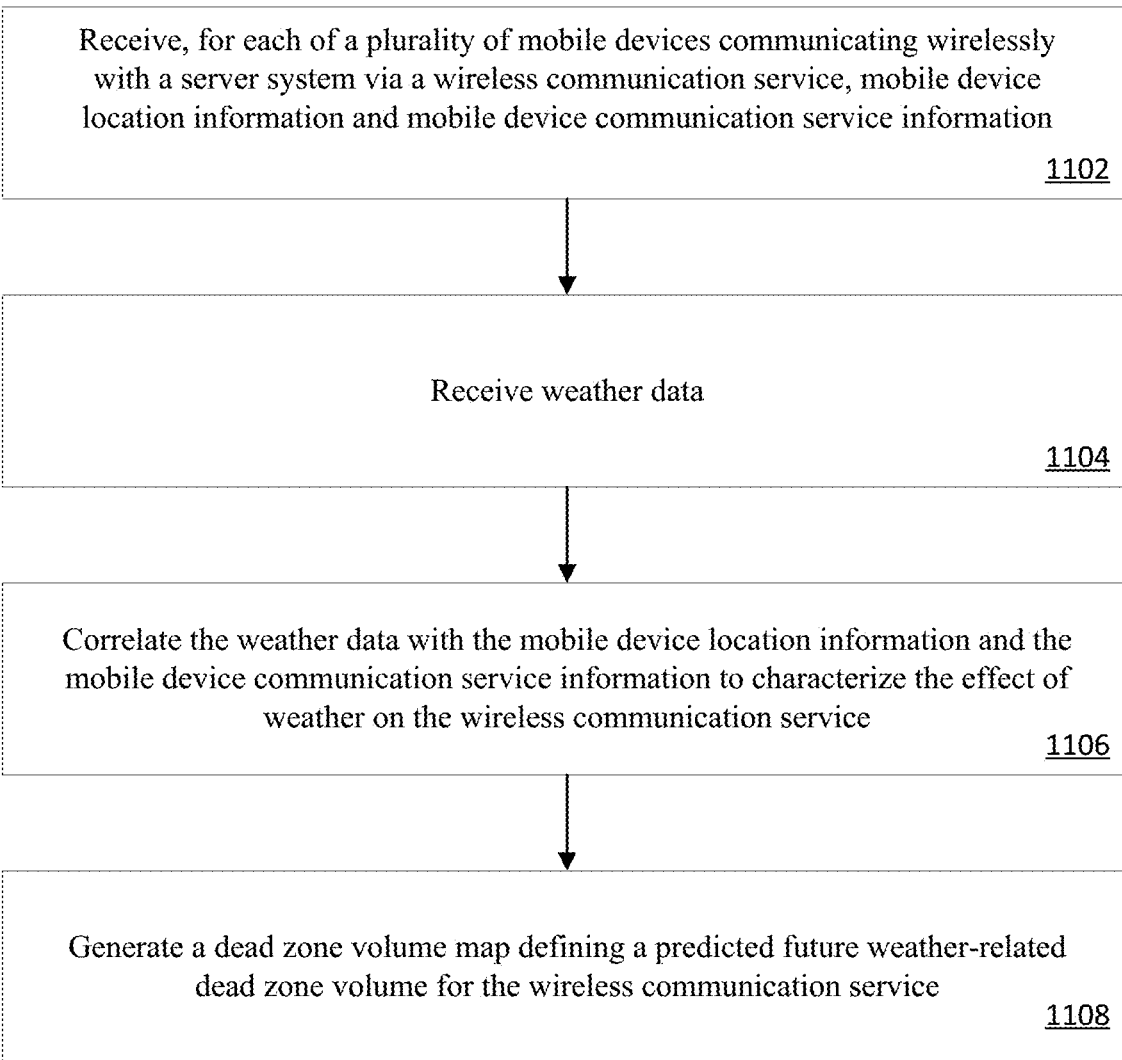
FIG. 11 is a logic flow diagram for predicting a future wireless coverage map based on weather information, in accordance with various embodiments.

FIG. 11 is a logic flow diagram for predicting a future wireless coverage map based on weather information, in accordance with various embodiments. Block 1102 includes receiving, for each of a plurality of mobile devices communicating wirelessly with a server system via a wireless communication service, mobile device location information and mobile device communication service information. Block 1104 includes receiving weather data. Block 1106 includes correlating the weather data with the mobile device location information and the mobile device communication service information to characterize the effect of weather on the wireless communication service. Block 1108 includes generating a dead zone volume map defining a predicted future weather-related dead zone volume for the wireless communication service. Embodiments can be applied to a wide variety of wireless communication services including, without limitation, a cellular wireless communication service or a WiFi wireless communication service. Embodiments can be applied to a wide range of server systems including, without limitation, enterprise asset management systems. The weather data may be correlated in time with the mobile device location information and the mobile device communication service information. The mobile device communication service information may include receive signal strength information at the mobile device location. The dead zone volume may be a three-dimensional volume.

FIG. 12 is a logic flow diagram for synchronization and resynchronization based on changes in a dead zone geofence, in accordance with various embodiments. Block 1202 includes monitoring changes in a dead zone volume relative to a location of a mobile device in communication with a server system via a wireless communication service. Block 1204 includes determining that the dead zone volume is approaching the location of the mobile device such that the mobile device is predicted to enter the dead zone volume. Block 1206 includes determining at least one data asset that will be needed for offline work within the dead zone volume. Block 1208 includes automatically transmitting the at least one data asset from the server system to the mobile device via the wireless communication service prior to the mobile device entering the dead zone volume. Block 1210 includes determining that the mobile device has subsequently exited the dead zone volume. Block 1212 includes automatically resynchronizing offline data stored locally by the mobile device while in the dead zone volume with corresponding data stored on the server system. Embodiments can be applied to a wide variety of wireless communication services including, without limitation, a cellular wireless communication service or a WiFi wireless communication service. Embodiments can be applied to a wide range of server systems including, without limitation, enterprise asset management systems. Transmitting the at least one data asset may involve determining an amount of data to be transmitted; determining an amount of transmission time based on the amount of data and a data rate available from the wireless communication service; determining an amount of time for the mobile device to enter the wireless communication dead zone; and beginning transmission of the at least one data asset such that transmitting the at least one data asset from the server system to the mobile device completes before the mobile device enters the wireless communication dead zone. Changes in the dead zone volume may be monitored using AI/ML. The wireless communication dead zone may be a three-dimensional volume.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAs, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off-the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., the EAM system 28, Coverage Map Module 32, Workflow Module 34, smartphone apps, etc.) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. A wireless coverage mapping method comprising:
   receiving, for each of a plurality of mobile devices communicating wirelessly with a server system, mobile device location information and mobile device communication service information;
   generating, by the server system, a dead zone volume map based on the mobile device location information and the mobile device communication service information, the dead zone volume map defining a dead zone volume for a wireless communication service;
   generating, by the server system, a dead zone geofence boundary volume map based on the dead zone volume map, the dead zone geofence boundary volume map defining a geofence boundary relative to the dead zone volume and further defining a buffer zone between at least a portion of the geofence boundary and at least a portion of the dead zone volume, the buffer zone defining a zone in which the wireless communication service is available for at least one of the mobile devices, wherein the geofence boundary of the dead zone geofence boundary volume map is based on an amount of data to be transmitted to a mobile device to provide sufficient time to transmit the amount of data to the mobile device while the mobile device is in the buffer zone between the geofence boundary and the dead zone volume; and upon determining that a given wireless device has reached or crossed the geofence boundary, beginning transmission of the amount of data to the given wireless device.

2. The method of claim 1, wherein the wireless communication service is a cellular wireless communication service.

3. The method of claim 1, wherein the wireless communication service is a WiFi wireless communication service.

4. The method of claim 1, wherein the server system comprises an enterprise asset management system.

5. The method of claim 1, wherein the geofence boundary of the dead zone geofence boundary volume map is further based on a data rate available from the wireless communication service.

6. The method of claim 1, wherein at least one of the dead zone volume map or the dead zone geofence boundary volume map is generated using artificial intelligence/machine learning (AI/ML).

7. The method of claim 1, wherein the dead zone volume is a three-dimensional volume.

8. A wireless coverage mapping system comprising:
at least one processor coupled to at least one memory containing instructions which, when executed by the at least one processor, causes the system to perform processes comprising:
receiving, for each of a plurality of mobile devices communicating wirelessly with a server system, mobile device location information and mobile device communication service information;
generating a dead zone volume map based on the mobile device location information and the mobile device communication service information, the dead zone volume map defining a dead zone volume for a wireless communication service;
generating a dead zone geofence boundary volume map based on the dead zone volume map, the dead zone geofence boundary volume map defining a geofence boundary relative to the dead zone volume and further defining a buffer zone between at least a portion of the geofence boundary and at least a portion of the dead zone volume, the buffer zone defining a zone in which the wireless communication service is available for at least one of the mobile devices, wherein the geofence boundary of the dead zone geofence boundary volume map is based on an amount of data to be transmitted to a mobile device to provide sufficient time to transmit the amount of data to the mobile device while the mobile device is in the buffer zone between the geofence boundary and the dead zone volume; and
upon determining that a given wireless device has reached or crossed the geofence boundary, beginning transmission of the amount of data to the given wireless device.

9. The system of claim 8, wherein the wireless communication service is a cellular wireless communication service.

10. The system of claim 8, wherein the wireless communication service is a WiFi wireless communication service.

11. The system of claim 8, wherein the server system comprises an enterprise asset management system.

12. The system of claim 8, wherein the geofence boundary of the dead zone geofence boundary volume map is further based on a data rate available from the wireless communication service.

13. The system of claim 8, wherein at least one of the dead zone volume map or the dead zone geofence boundary volume map is generated using artificial intelligence/machine learning (AI/ML).

14. The system of claim 8, wherein the dead zone volume is a three-dimensional volume.

15. A computer program product comprising at least one tangible, non-transitory computer-readable storage medium having embodied therein computer program instructions which, when executed by one or more processors of a system, cause the system to perform computer processes comprising:
receiving, for each of a plurality of mobile devices communicating wirelessly with a server system, mobile device location information and mobile device communication service information;
generating a dead zone volume map based on the mobile device location information and the mobile device communication service information, the dead zone volume map defining a dead zone volume for a wireless communication service;
generating a dead zone geofence boundary volume map based on the dead zone volume map, the dead zone geofence boundary volume map defining a geofence boundary relative to the dead zone volume and further defining a buffer zone between at least a portion of the geofence boundary and at least a portion of the dead zone volume, the buffer zone defining a zone in which the wireless communication service is available for at least one of the mobile devices, wherein the geofence boundary of the dead zone geofence boundary volume map is based on an amount of data to be transmitted to a mobile device to provide sufficient time to transmit the amount of data to the mobile device while the mobile device is in the buffer zone between the geofence boundary and the dead zone volume; and
upon determining that a given wireless device has reached or crossed the geofence boundary, beginning transmission of the amount of data to the given wireless device.

16. The computer program product of claim 15, wherein the wireless communication service is a cellular wireless communication service.

17. The computer program product of claim 15, wherein the wireless communication service is a WiFi wireless communication service.

18. The computer program product of claim 15, wherein the server system comprises an enterprise asset management system.

19. The computer program product of claim 15, wherein the geofence boundary of the dead zone geofence boundary volume map is further based on a data rate available from the wireless communication service.

20. The computer program product of claim 15, wherein at least one of the dead zone volume map or the dead zone geofence boundary volume map is generated using artificial intelligence/machine learning (AI/ML).

21. The computer program product of claim 15, wherein the dead zone volume is a three-dimensional volume.

* * * * *